US010025549B1

(12) United States Patent
Welck

(10) Patent No.: US 10,025,549 B1
(45) Date of Patent: Jul. 17, 2018

(54) IMMERSIVE DIGITAL DISPLAY SYSTEMS

(71) Applicant: Steve Welck, Costa Mesa, CA (US)

(72) Inventor: Steve Welck, Costa Mesa, CA (US)

(73) Assignee: Steve Welck, Costa Mesa, CA (US)

( * ) Notice: Subject to any disclaimer, the term of this patent is extended or adjusted under 35 U.S.C. 154(b) by 0 days.

(21) Appl. No.: 15/217,967

(22) Filed: Jul. 22, 2016

Related U.S. Application Data

(60) Provisional application No. 62/195,770, filed on Jul. 22, 2015.

(51) Int. Cl.
*G09G 5/00* (2006.01)
*G06F 3/14* (2006.01)
*G09G 3/3208* (2016.01)
*G06F 3/147* (2006.01)

(52) U.S. Cl.
CPC ............ *G06F 3/1446* (2013.01); *G06F 3/147* (2013.01); *G09G 3/3208* (2013.01); *G09G 2300/026* (2013.01); *G09G 2320/0233* (2013.01); *G09G 2320/0276* (2013.01); *G09G 2320/043* (2013.01); *G09G 2320/0666* (2013.01); *G09G 2320/0693* (2013.01)

(58) Field of Classification Search
CPC ..... G06F 3/1446; G06F 3/147; G09G 3/3208; G09G 2320/043; G09G 2320/0666; G09G 2320/0233; G09G 2300/026; G09G 2320/0693; G09G 2320/0276

See application file for complete search history.

(56) References Cited

U.S. PATENT DOCUMENTS

| | | | | |
|---|---|---|---|---|
| 5,002,368 | A * | 3/1991 | Anglin | G02F 1/133308 248/634 |
| 6,088,140 | A * | 7/2000 | Klug | G02B 5/32 359/22 |
| 2002/0000428 | A1 * | 1/2002 | Dulaney | B23K 26/0069 219/121.69 |
| 2002/0031316 | A1 * | 3/2002 | Lowry | G02B 6/06 385/120 |
| 2005/0134525 | A1 * | 6/2005 | Tanghe | G06F 3/1446 345/1.1 |
| 2011/0057861 | A1 * | 3/2011 | Cok | H01L 27/3293 345/1.3 |
| 2014/0073409 | A1 * | 3/2014 | Lesley | A63F 13/06 463/25 |
| 2016/0210104 | A1 * | 7/2016 | Welck | G09F 9/3026 |

* cited by examiner

*Primary Examiner* — Erin M File
(74) *Attorney, Agent, or Firm* — Wong & Rees LLP; Kirk D. Wong

(57) ABSTRACT

A Digital visualization sphere and hemispherical dome display relates to a modular Virtual Reality (VR) remote visualization chamber with telepresence and telexistance utilizing hi-density light-emitting diode (LED) or organic light-emitting diode (OLED) spherical display module(s) constructed monolithically.

8 Claims, 27 Drawing Sheets

ISOMETRIC VIEW

Digital Visualization Sphere

ISOMETRIC VIEW

Digital Visualization Sphere

ISOMETRIC VIEW

Hemispherical Dome Display

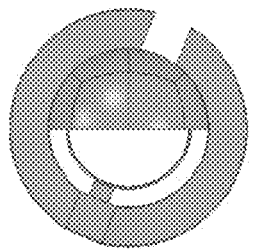
TOP VIEW
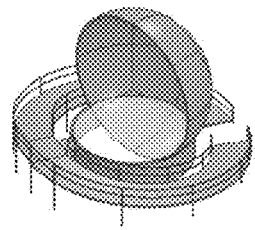
ISOMETRIC VIEW
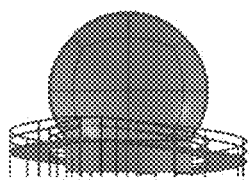
FRONT VIEW
FIG. 26
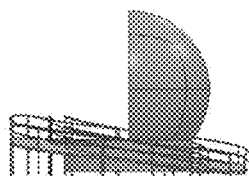
RIGHT VIEW
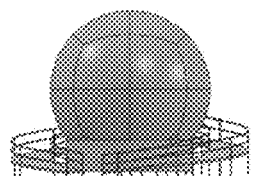
REAR VIEW
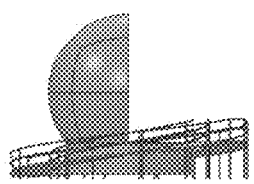
LEFT VIEW

IMMERSIVE DIGITAL DISPLAY SYSTEMS

PRIORITY CLAIM

This application claims benefit of Provisional Application No. 62/195,770, filed Jul. 22, 2015, the entire contents of which is hereby incorporated by reference as if fully set forth herein, under 35 U.S.C. § 119(e).

TECHNICAL FIELD

Embodiments relate generally to digital display systems, and, more specifically, to techniques for incorporating digital displays into immersive display systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Current LED and OLED technology incorporates luminescent materials that produce intense and high contrast digital video content. Conventional integrated LED/OLED displays are flat or flat and mounted on curved faceted structures forming a complete display of varying sizes and aspect ratios. Conventional OLED displays are flat, transparent and slightly bent structures forming a complete display of limited sizes and aspect ratios.

BRIEF DESCRIPTION OF THE DRAWINGS

The present invention is illustrated by way of example, and not by way of limitation, in the figures of the accompanying drawings and in which like reference numerals refer to similar elements and in which:

FIG. 26 illustrates multiple 3D perspective views including a top view, isometric view, front view, right view, rear view, and left view, of a hemispherical digital display system, according to an embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
   2.1 Immersive Digital Cinema (IDC) Display Environment
   2.2 Spherical and Hemispherical Digital Dome Display Environment
4.0. Signal Transmission and Control
5.0. Implementation Mechanism—Hardware Overview
6.0. Extensions and Alternatives 1.0. General Overview Approaches, techniques, and mechanisms are disclosed for immersive digital display systems and spherical and hemispherical digital dome display systems.

Digital displays are described herein with the flexibility to customize display sizes and shapes that conform to architectural environments. For example, the current production of modular LED/OLED panels is infinitely scalable but is limited to long radius bends in one direction and is most often faceted. An embodiment is an Immersive Digital Cinema (IDC) display environment that can bend in all directions and fill interior architectural space as needed to create appealing virtual reality visualization. Imagine a tranquil forest or limitless vistas over an ocean presented within an uninterrupted wraparound digital video environment. IDC display environments are an alternative to large digital projectors and screens that have expensive renewables and high power consumption. Theaters and attractions can benefit from fixed IDC display environments which have many advantages over video projectors by providing a more compact ruggedized alignment free system. Low power consumption and minimal maintenance will also set IDC display environments apart from other often used media delivery platforms.

Figure 4:
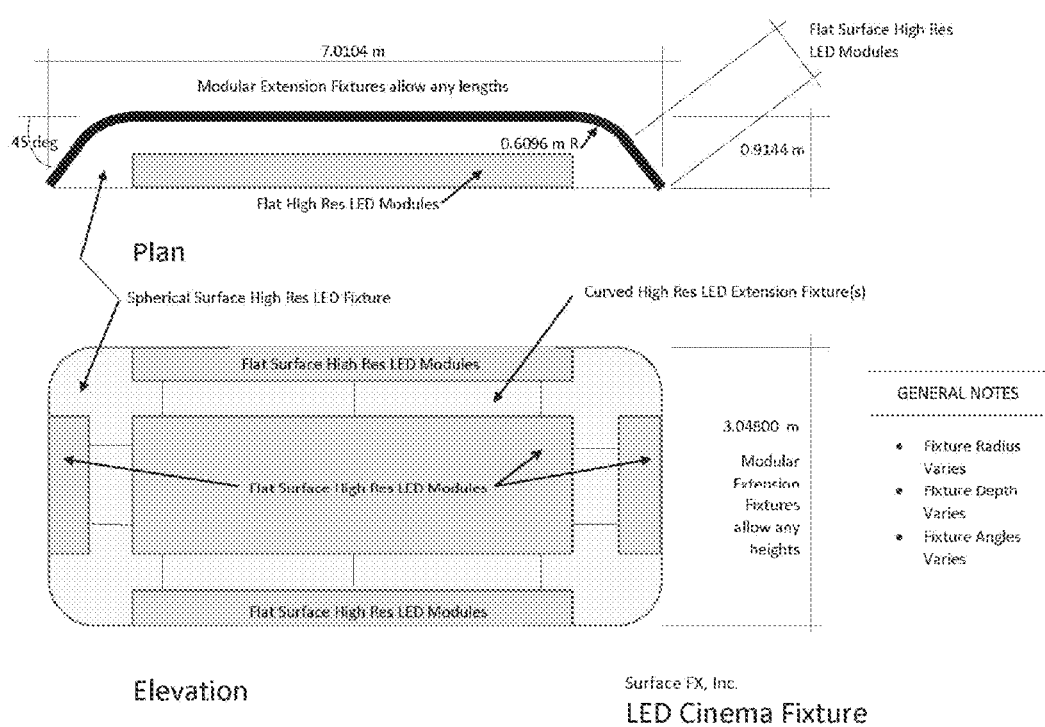
FIG. 4 illustrates an LED cinema fixture, according to an embodiment.
Figure 5:
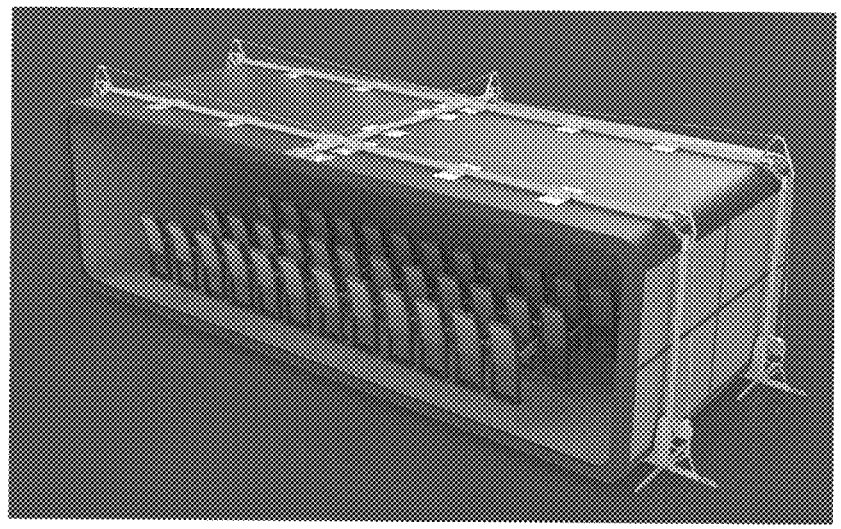
FIG. 5 illustrates an example digital environment, according to an embodiment.
Figure 6:
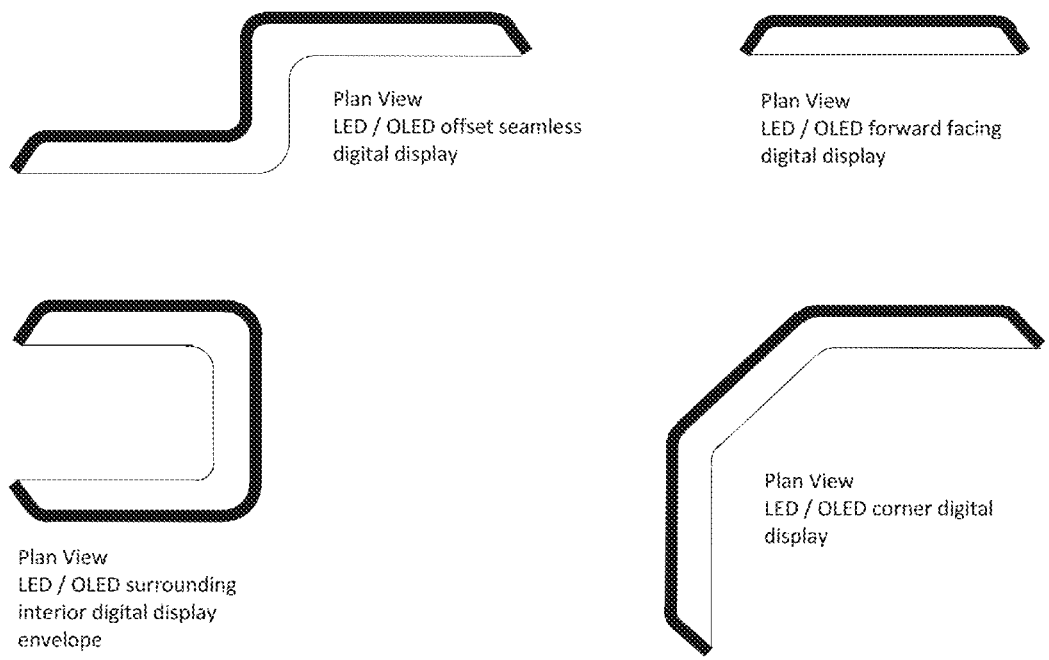
FIG. 6 illustrates modular fixtures, according to an embodiment.
Figure 7:
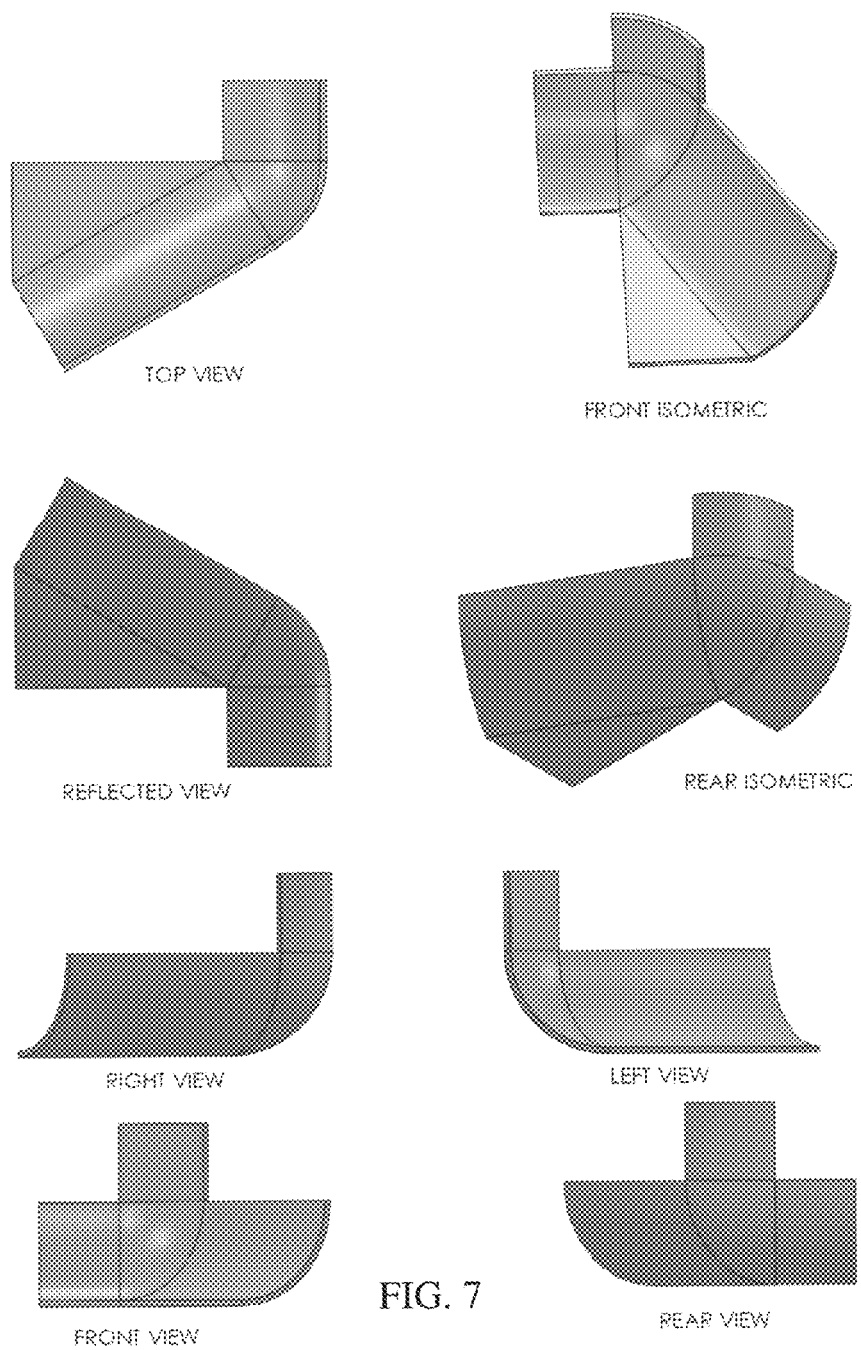
FIG. 7 illustrates multiple 3D perspective views including a top view, front isometric, reflected view, rear isometric, right view, left view, front view, and rear view, of a modular fixture, according to an embodiment.
Figure 8:
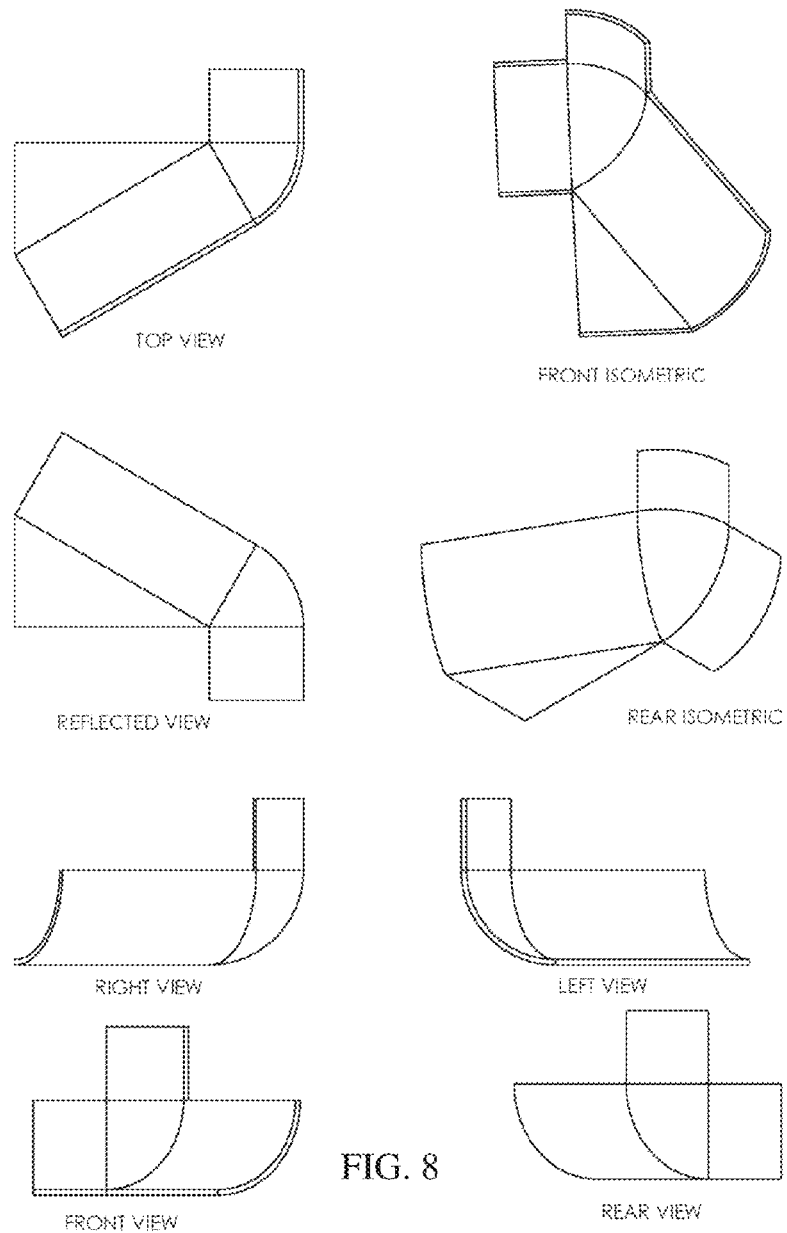
FIG. 8 illustrates multiple perspective views including a top view, front isometric, reflected view, rear isometric, right view, left view, front view, and rear view, of a modular fixture, according to an embodiment.
Figure 9:
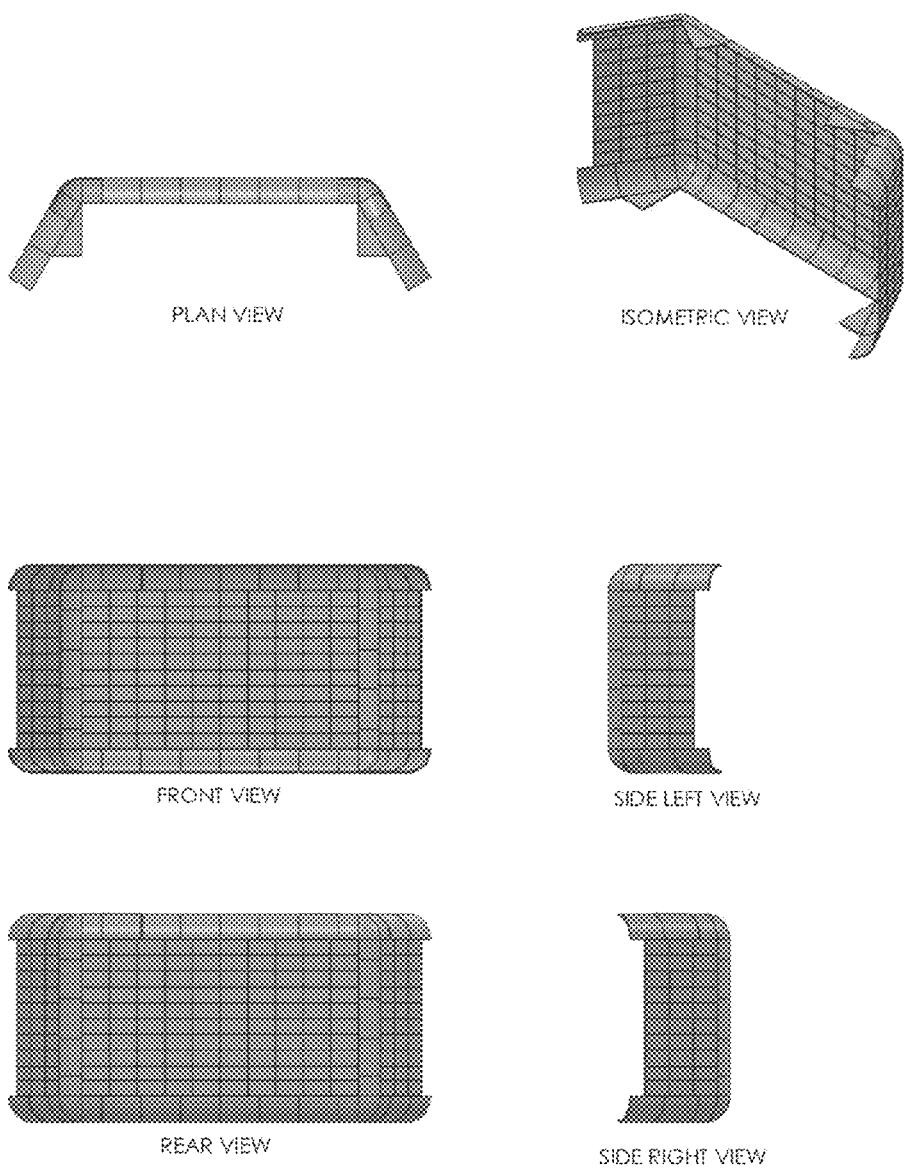
FIG. 9 illustrates multiple perspective views including a top view, front isometric, reflected view, rear isometric, right view, left view, front view, and rear view, of an LED cinema fixture, according to an embodiment.
Figure 10:
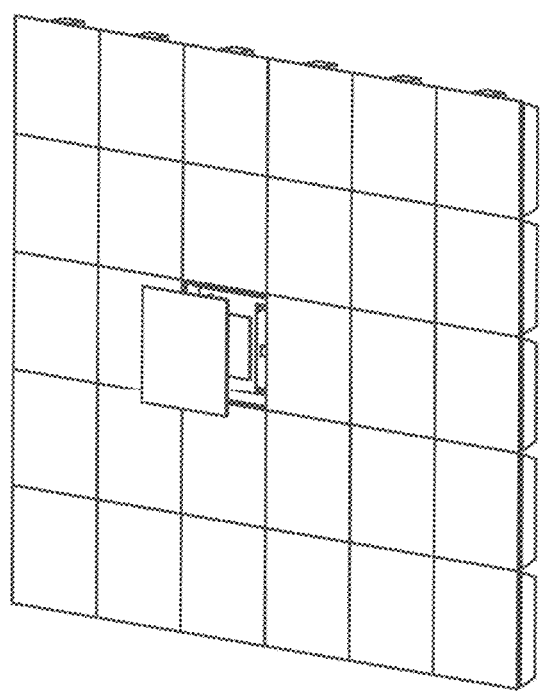
FIG. 10 illustrates a modular fixture, according to an embodiment.
Figure 11:
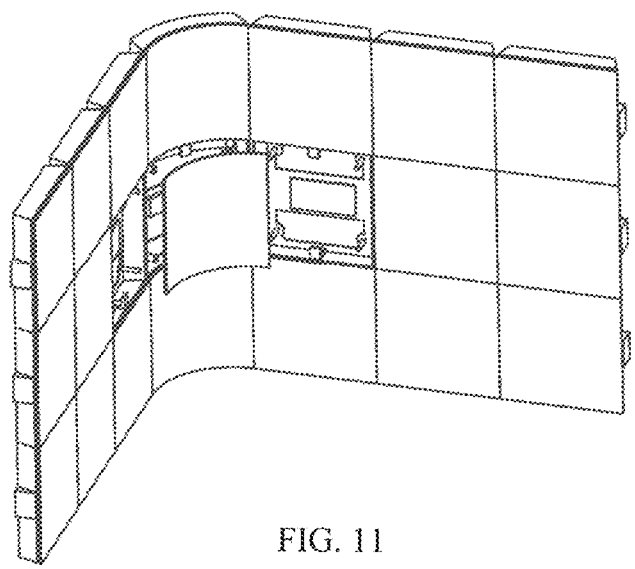
FIG. 11 illustrates a modular fixture, according to an embodiment.
Figure 12:
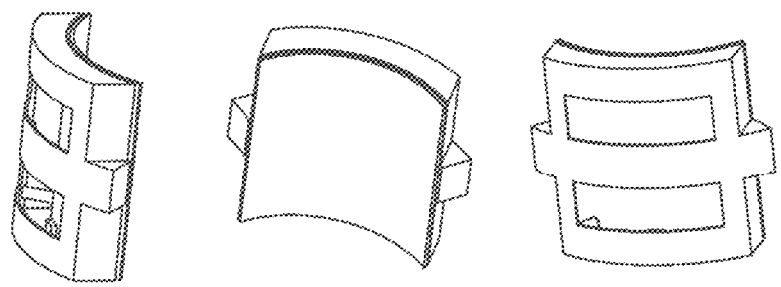
FIG. 12 illustrates a modular fixture, according to an embodiment.
Figure 13:
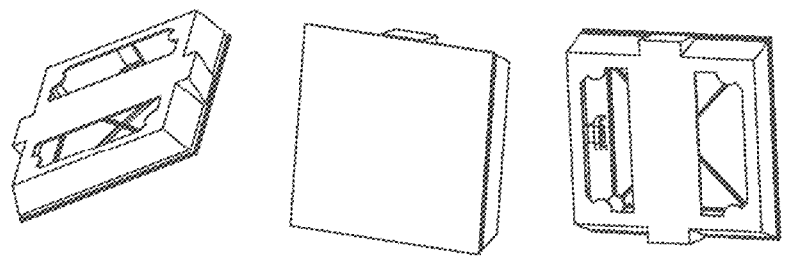
FIG. 13 illustrates a modular fixture, according to an embodiment.
Figure 14:
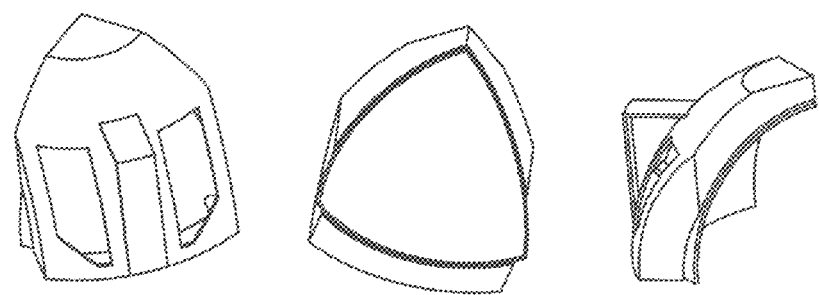
FIG. 14 illustrates a modular fixture, according to an embodiment.
Figure 15:
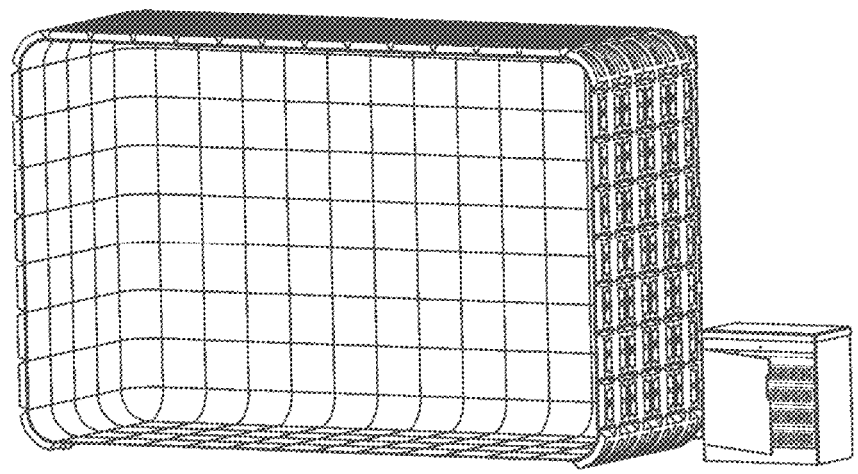
FIG. 15 illustrates an LED cinema fixture with control apparatus, according to an embodiment.
Figure 16:
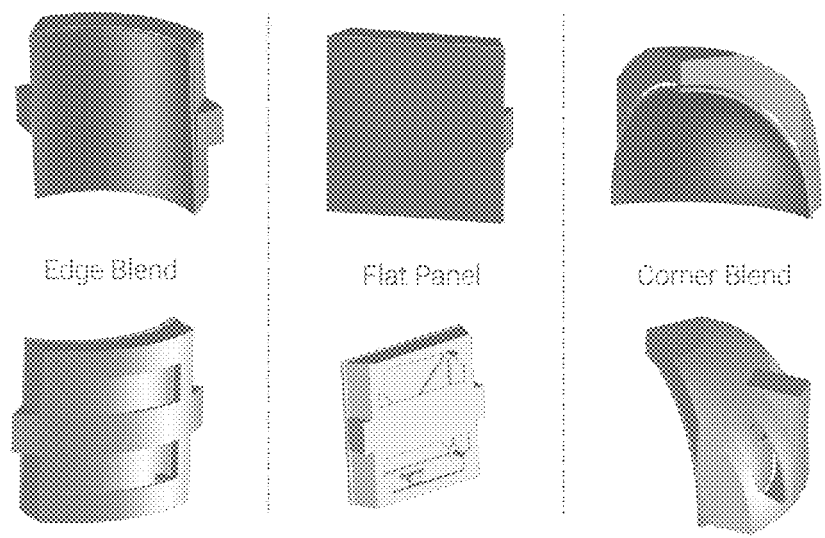
FIG. 16 illustrates multiple 3D perspective views including an edge blend view, flat panel view, and corner blend view, of modular fixtures, according to an embodiment.
Figure 17:
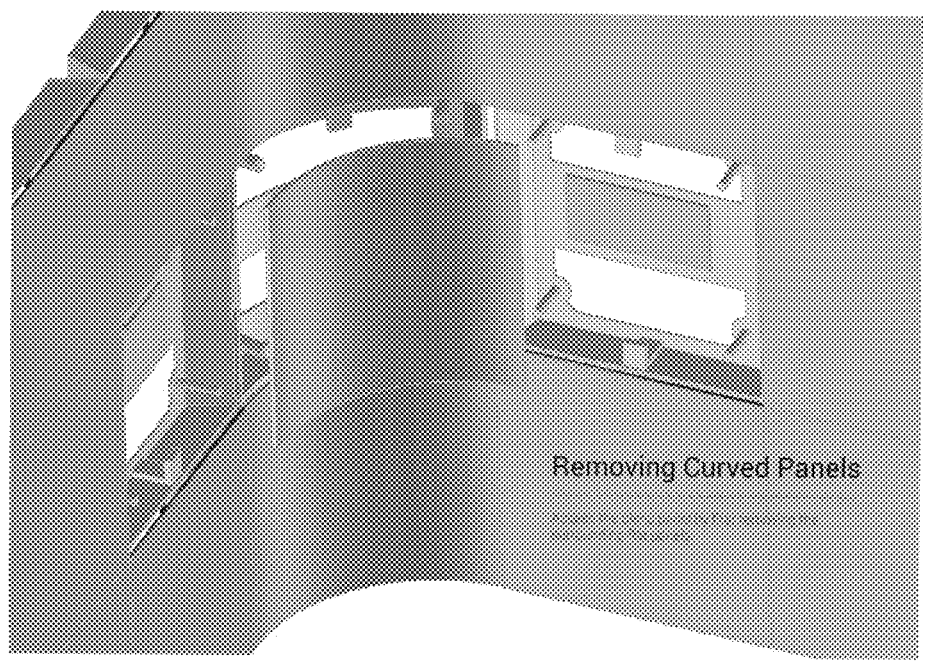
FIG. 17 illustrates a curved modular fixture, according to an embodiment.
Figure 18:
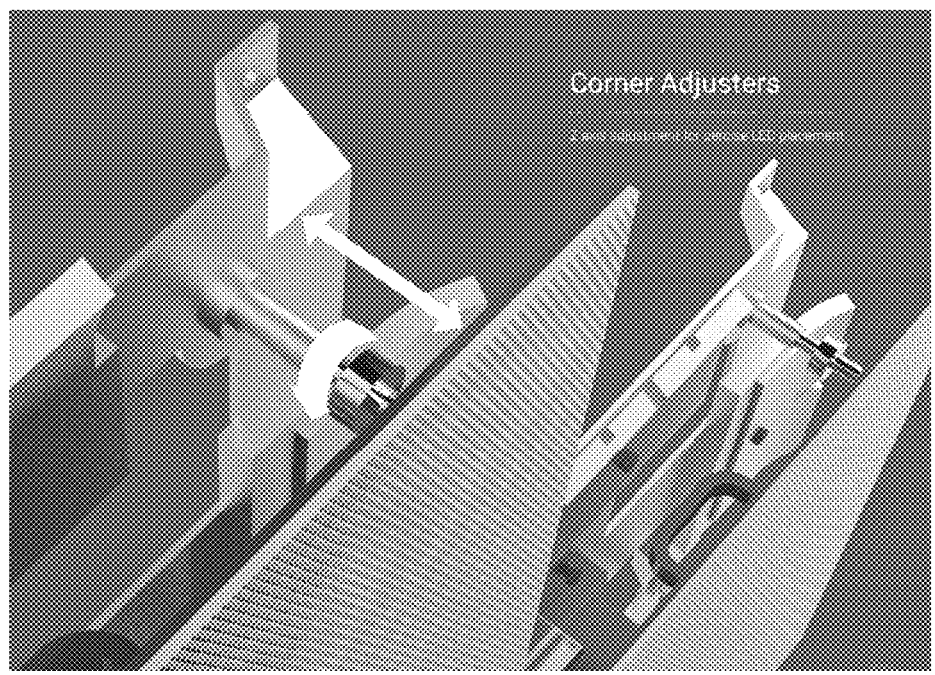
FIG. 18 illustrates corner adjusters for mounting a modular fixture, according to an embodiment.
Figure 19:
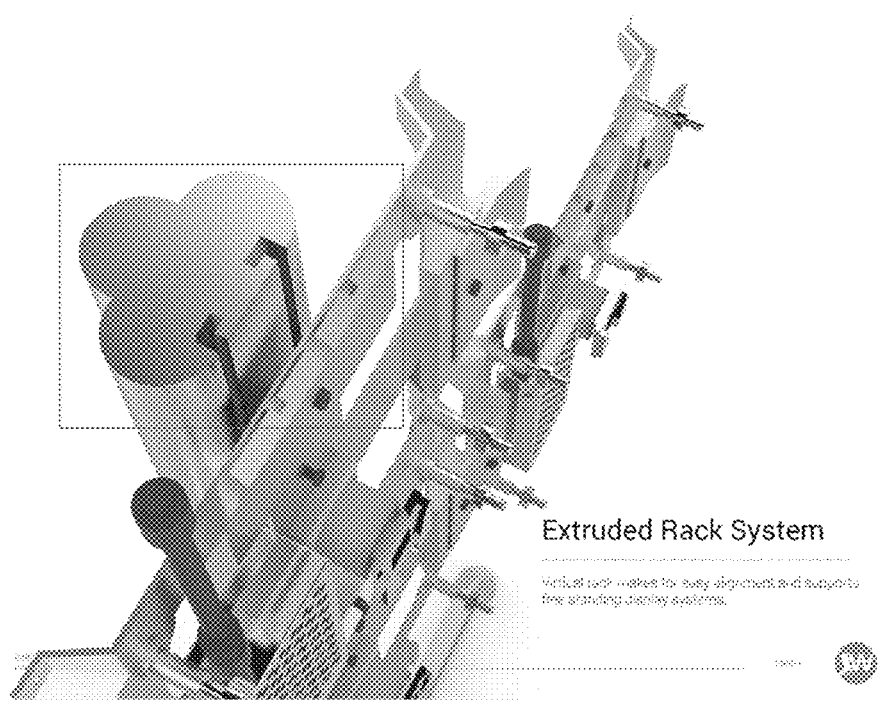
FIG. 19 illustrates an extruded rack system, according to an embodiment.

IDC display environments of varying practical angles, radii and sizes can be implemented as product line features. Referring to FIG. 4, IDC display environments may have many alternate form factors configurations. Referring to FIG. 6, the modular array of fixtures are the building blocks that can be used to create many new digital environments such as FIG. 5.

Spherical and hemispherical digital dome display systems in various sizes are also described herein. In an embodiment, these spherical environments are well suited for native spherical digital video media delivery. For example, current digital projectors, screens and domes are bulky and require multiple rear or forward positioned screen projectors. The embodiment's digital visualization sphere and hemispherical dome display utilizes LED/OLED spherical digital display module(s) to create a seamless digital visualization and virtual reality environment. Imagine mountain climbing or hiking through a remote jungle within an uninterrupted wraparound digital video environment. The digital visualization sphere and hemispherical dome display environments are an alternative to huge digital projectors and screens that have expensive renewables and high power consumption. Theaters and attractions can benefit from spherical LED/OLED digital visualization display environments which have many advantages over video projectors including, but not limited to: eliminating projector distances, providing a more compact system with unobscured sight lines, etc. Low power consumption and minimal maintenance also sets the spherical digital visualization environments apart from other often used media delivery platforms.

Referring to FIGS. 22-26, digital visualization sphere and hemispherical dome display(s) of varying radii and sizes can be implemented as product line features.

In other aspects, the invention encompasses computer apparatuses and computer-readable media configured to carry out the foregoing techniques.

2.0. Structural Overview 2.1 Immersive Digital Cinema (IDC) Display Environment

In an embodiment, IDC fixtures and assemblies relate to a scalable immersive digital display utilizing transitionally adaptive light-emitting diode fixture(s) constructed monolithically with bends and spherical corner transitions, e.g., a light-emitting diode (LED) or organic light-emitting diode (OLED) display fixture for use in modular and scalable immersive digital display applications for theater, retail display, virtual reality, simulation, exhibits and attractions. These LED digital display fixtures adapt hi density LED tiles to create seamless wrap around visualization of display content. The display fixtures are constructed monolithically with bends and spherical corner transitions designed to immerse viewers within a digital display environment.

Figure 1:
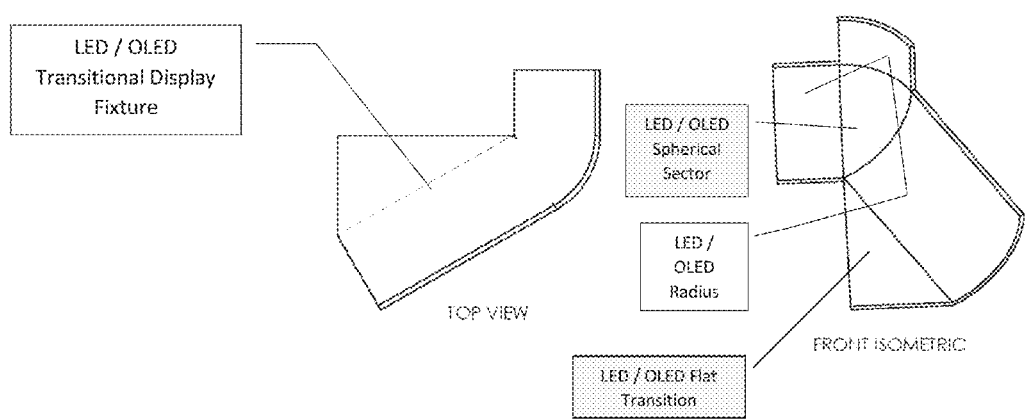
FIG. 1 illustrates a transitional form fixture, according to an embodiment.
Figure 2:
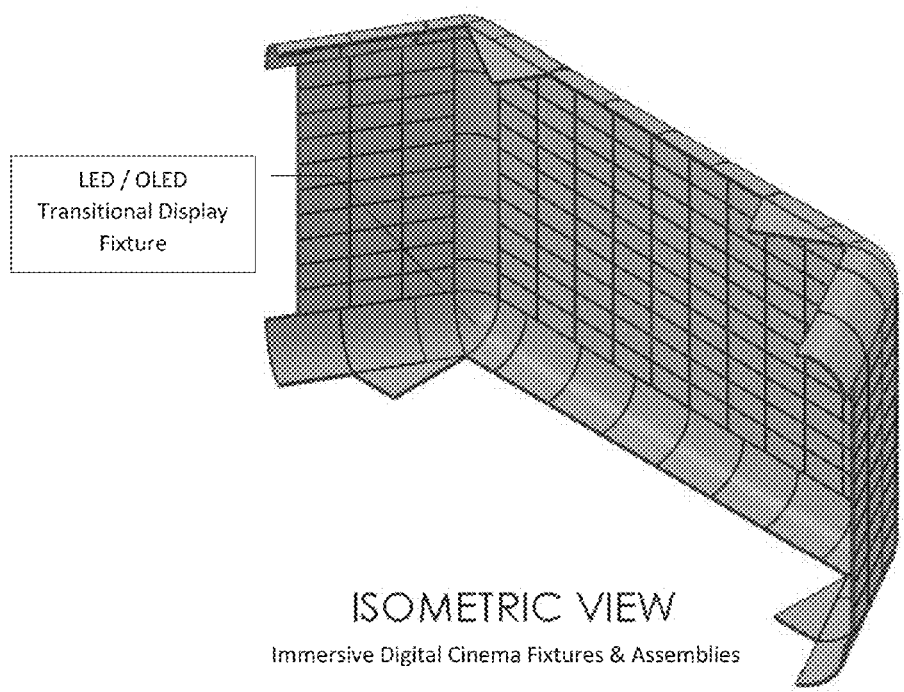
FIG. 2 illustrates an assembly with tiled OLED/LED display integration, according to an embodiment.
Figure 3:
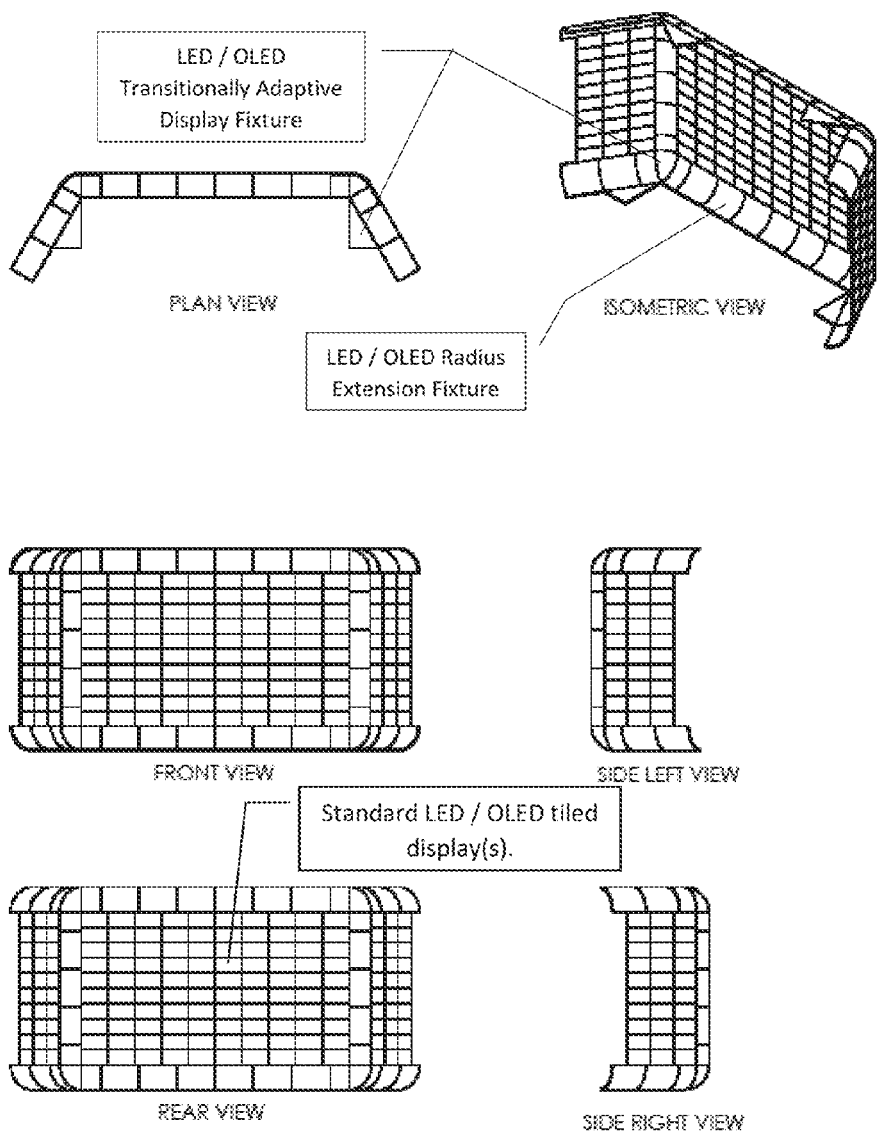
FIG. 3 illustrates multiple views including a plan view, isometric view, front view, rear view, side left view, and side right view, of an assembly with tiled OLED/LED display integration, according to an embodiment.

Referring to FIG. 1, an embodiment of the transitional form fixture digital display assembly is shown, which may include a precision modular metal chassis, power supply, a cooling system with cooling fans, cooling blocks and a control system, along with a control board with a processor, display board and a substrate. It may also include a digital video interface and an automatic addressing system. Referring to FIG. 2, an embodiment further includes a method of assembly with tiled OLED/LED display integration and a method of replacing, adding, or removing one or more assemblies in varying sizes and configurations.

The display assembly is a transitionally adaptive LED/OLED display fixture, which conforms and joins with standard LED/OLED tiled display(s) thereby creating seamless digital environments. The display assembly is not limited to adapting to LED/OLED displays but may be used with tiled emissive displays for wrap around digital visualization. Tiled emissive displays may have pixel elements or groups of pixel elements, each being individually addressable to display an image. These displays are described as fixed format displays. The term "fixed format" refers to addressable, fixed position, pixel elements. Fixed format displays can be tiled and scalable. Emissive displays include Light Emitting Diode, Plasma, electroluminescent displays, etc.

The display assembly is a configurable transitionally adaptive LED/OLED display fixture(s) and LED/OLED tile assemblies for use in large immersive display applications. The transitionally adaptive LED/OLED display fixture(s) according to an embodiment of the present invention is operating with a set of LED/OLED display tiles forming a larger tiled display. The word "display" means a set of addressable pixels in an array or in groups of arrays. Several display tiles will be integrated with transitionally adaptive LED/OLED display fixture(s) to form a larger display, i.e. multiple display elements arranged side-by-side so that they can be viewed as a single image.

The hardware of the transitionally adaptive LED/OLED display fixture(s) combined with LED/OLED display tile(s) or LED/OLED tile assembly of the present invention is a precision electronics chassis and enclosure containing an array of LED/OLED printed circuit board(s) (PCB), tile assembly, control board(s), display board(s), power supply(s), data connectors and heat mitigation systems. The transitionally adaptive LED/OLED display fixture(s) and LED/OLED tile assembly are connected to processing system.

The precision modular metal or alternatively, molded, structural chassis serves as the primary mechanical structure for all of electronic elements, control cards, PCB boards, integrated power and wiring channels, transitionally adaptive LED/OLED display fixture(s) and LED/OLED tile assemblies. Precision modular chassis will accommodate front or alternatively Rear module access for transitionally adaptive LED/OLED display fixture(s) and LED/OLED tile assemblies repair and replacement. The precision chassis is formed of any suitably strong material, such as light metal alloys, that will support the shape and structure of the transitionally adaptive LED/OLED display fixture(s) and LED/OLED tile assemblies. The precision chassis is a fixed shaped modular configuration comprised of transitionally adaptive LED/OLED display fixture(s) and LED/OLED tile assembly. Mounted within the precision chassis are positioning plates, threaded inserts, connection points and pins with alignment tabs. The precision chassis will have air inlets and outlets and data and power input and output connectors. The transitionally adaptive LED/OLED display fixture(s) and LED/OLED tile assembly will mechanically couple to positioning plates and extruded rack system.

Also positioned within enclosure are integrated wiring channels with data input, data output, power input, and power output connectors. Data input connectors and data output connectors are conventional signal connectors like DVI or MOLEX. The data input connector provides a connection to receive serial video data signals containing the current video frame information and serial control data signals from a general processor to be displayed on transitionally adaptive LED/OLED display fixture(s) and LED/OLED tile assemblies.

The transitionally adaptive LED/OLED display fixture(s) and LED/OLED tile assembly can re-transmit serial video and control data signals to an adjacent, LED/OLED assembly via data output connectors. The conventional power input and power output connectors provides an electrical connection for receiving AC input power to transitionally adaptive LED/OLED display fixture(s) and LED/OLED tile assemblies.

The substrate material of a configurable transitionally adaptive LED/OLED display fixture(s) and LED/OLED tile assembly is non-conductive. The pixel array substrate is formed of a plurality of addressable discrete LED/OLED pixels. Those skilled in the art will appreciate that the LED/OLED devices for forming graphics display are typically arranged in rows and columns to form an LED/OLED matrix. The display does not have to be formed in Cartesian co-ordinates but may be provided in other co-ordinate systems.

Standard connectors are required for transferring signals and power from control board to the plurality of transitionally adaptive LED/OLED display fixture(s) and LED/OLED boards. One connector is required per transitionally adaptive LED/OLED display fixture(s) and LED/OLED tile assembly. Connectors must span the distance between transitionally adaptive LED/OLED display fixture(s) and LED/OLED control boards and with precise clearances for the thickness of chassis channel openings, cooling blocks, wiring, etc.

The control board is a conventional printed circuit board (PCB) formed of a material such as ceramic or FR4, upon which are mounted the local processing and control devices needed to operate the transitionally adaptive LED/OLED display fixture(s) and LED/OLED module assemblies. In general, control board performs pre-processing tasks, such as gamma correction, gamma adjustment of the incoming signal, color and light calibration.

Multi-line distribution of signal data comes from a central processing unit and supplied to an input DATA IN signal of serial video and control data. Data is re-transmitted to transitionally adaptive LED/OLED display fixture(s) and LED/OLED tile assembly. Similarly, data transmits the received serial video and control data signal to an input of data and to data input connector of transitionally adaptive LED/OLED display fixture(s) and LED/OLED tile assembly. The data transmits the received serial video and control data to data input connector of transitionally adaptive LED/OLED display fixture(s) and LED/OLED tile assembly. The DATA IN signal is distributed to all transitionally adaptive LED/OLED display fixture(s) and LED/OLED tile assembly. The serial video and control data is transferred from one LED/OLED assembly to the next LED/OLED assembly. In each case, the serial video and control data is re-transmitted by control board of each transitionally adaptive LED/OLED display fixture(s) and LED/OLED tile assembly.

A conventional power supply with a AC-to-DC converter and a voltage regulator per transitionally adaptive LED/OLED display fixture(s) and LED/OLED tile assemblies will be required. Conventional DC cooling fans capable of providing a volume rate of airflow in order to maintain an operating temperature for transitionally adaptive LED/OLED display fixture(s) LED/OLED tile assembly are required. Insulation sheets for the power supply of a suitable material, such as mica is required.

Multi-line distribution of electrical power is accomplished by AC power connections from one transitionally adaptive LED/OLED display fixture(s) and LED/OLED tile assembly to the next. A POWER INPUT signal from the main power supply is supplied to transitionally adaptive LED/OLED display fixture(s) and LED/OLED tile assembly via an electrical connection to power input connector on the LED/OLED assembly. AC power is then transferred from LED/OLED assembly to LED/OLED assembly via an electrical connection between power output connector assembly and power input connector on the LED/OLED tile assemblies.

The central system controller is aware of the X and Y configuration of each transitionally adaptive LED/OLED display fixture and LED/OLED tile assembly. Transitionally adaptive LED/OLED display fixture and LED/OLED tile assembly location in the array are addressed with sophisticated software. Each transitionally adaptive LED/OLED display fixture and LED/OLED tile assembly is assigned a unique number in the picture co-ordinates. The transitionally adaptive LED/OLED display fixture(s) and LED/OLED tile assembly are established at set-up and each assembly stores its configuration information locally so the process is not repeated with each power cycle.

Transitionally adaptive LED/OLED display fixture(s) and LED/OLED tile processing is fed by an incoming red, green, blue data signal RGB DATA IN that is a serial data signal containing the current video frame information to be displayed on LED/OLED assembly.

The tile processing unit buffers the incoming RGB data signal and supplies an RGB output data signal. Control data from a general processor, such as a personal computer (PC) for example functions as the system-level controller of each transitionally adaptive LED/OLED display fixture and LED/OLED tile assembly is supplied to tile processing unit via a serial data bus that provides control information to each transitionally adaptive LED/OLED display fixture and to the LED/OLED tile assembly, with color temperature, gamma, and imaging information. The tile processing unit buffers the control data from the data bus supplying an output control data signal to an outgoing data bus to each transitionally adaptive LED/OLED display fixture and LED/OLED tile assembly processing unit then re-transmits the data signal RGB data inputs and the control data on the data bus to the next transitionally adaptive LED/OLED display fixture or LED/OLED tile assembly.

The imaging information from the control data signal on the data bus, tile processing unit, stores the RGB serial data signal for each frame that corresponds to either transitionally adaptive LED/OLED display fixture and LED/OLED tile assembly to the physical position of a given transitionally adaptive LED/OLED display fixture or LED/OLED tile assembly being used within a larger tiled display.

In the case of each transitionally adaptive LED/OLED display fixture and LED/OLED tile assembly the processing unit of each transitionally adaptive LED/OLED display fixture and LED/OLED tile assembly associated with an LED/OLED array in the display receives the RGB data signal and moves this information into specific data packets associated with the location of each transitionally adaptive LED/OLED display fixture and LED/OLED tile assembly within the display. Algorithms running on each transitionally adaptive LED/OLED display fixture and LED/OLED tile assembly belongs to its physical portion of the display. The processing unit distributes a serial RGB signal to a pre-processor which belongs to a portion of the display.

Similarly, the transitionally adaptive LED/OLED display fixture and to the LED/OLED tile assembly processing unit receives the control data on the control data bus and parses this information into specific control buses associated with the location of a given transitionally adaptive LED/OLED display fixture and to the LED/OLED tile assembly.

The electrically connected elements of transitionally adaptive LED/OLED display fixture and to the LED/OLED tile assembly control system are as follows; The RGB signal RGB from tile processing unit feeds a pre-processor; a control bus output of pre-processor feeds bank switch controller; a control bus output of pre-processor feeds CCD controller; a control bus output LED/OLED CONTROL of bank switch controller feeds bank switches that are connected to the row lines of transitionally adaptive LED/OLED display fixture(s) and to the LED/OLED tile assembly; and a pulse width modulation control bus output of CCD controller feeds current sources that are connected to the column lines of LED/OLED array via active switch devices, such as MOSFET switches or transistors. A bus output analog voltage of LED/OLED array feeds A/D converter; a bus output DIGITAL VOLTAGE of A/D converter feeds module interface; and a bus output TEMPERATURE DATA of temperature sensor feeds module interface. The control bus output of the tile processing unit also feeds module interface. An input/output bus EEPROM I/O exists between EEPROM and module interface; an input/output bus DATA I/O exists between pre-processor and module interface; and, lastly, module interface drives a data bus module to tile processing unit. Critical diagnostic information, such as temperature, ageing factors, and other color correction data, is available to tile processing unit via the data bus module.

2.2 Spherical and Hemispherical Digital Dome Display Environment

In an embodiment, Digital visualization sphere and hemispherical dome display relates to a modular Virtual Reality (VR) remote visualization chamber with telepresence and telexistance utilizing hi-density light-emitting diode (LED) or organic light-emitting diode (OLED) spherical display module(s) constructed monolithically. The module fixture trim transitions well with LED/OLED uniformity at intersecting modules, e.g. a light-emitting diode (LED) or organic light-emitting diode (OLED) spherical fixtures(s) for use in modular and scalable immersive digital display applications for theater, retail display, virtual reality, simulation, exhibits and attractions. These LED/OLED spherical digital display modules come together with spherical geometric modalities geometry and uniformity creating seamless wrap around visualization of spherical content in both spherical and hemispherical configurations. The display module fixtures are constructed monolithically with a uniform spherical figure designed to immerse viewers within a digital display environment. The or alternatively hemispherical dome display(s) can stand alone or integrate in clusters. The spherical assembly bisected by the meridian creates two identical hemispherical halves.

Figure 20A:
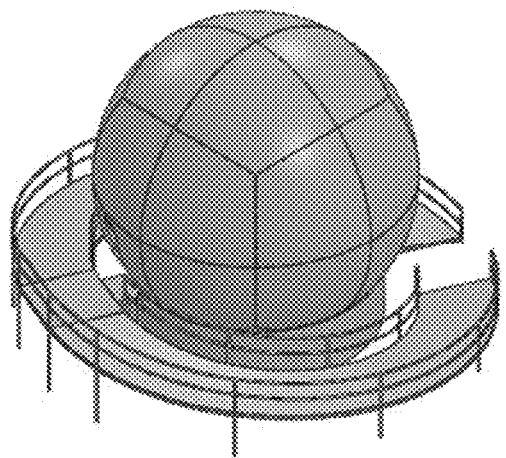
FIGS. 20a-20b illustrate a digital visualization sphere and hemispherical dome, according to an embodiment.
Figure 20B:
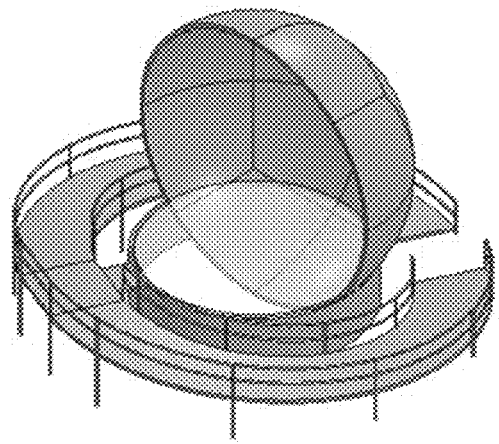
Figure 21:
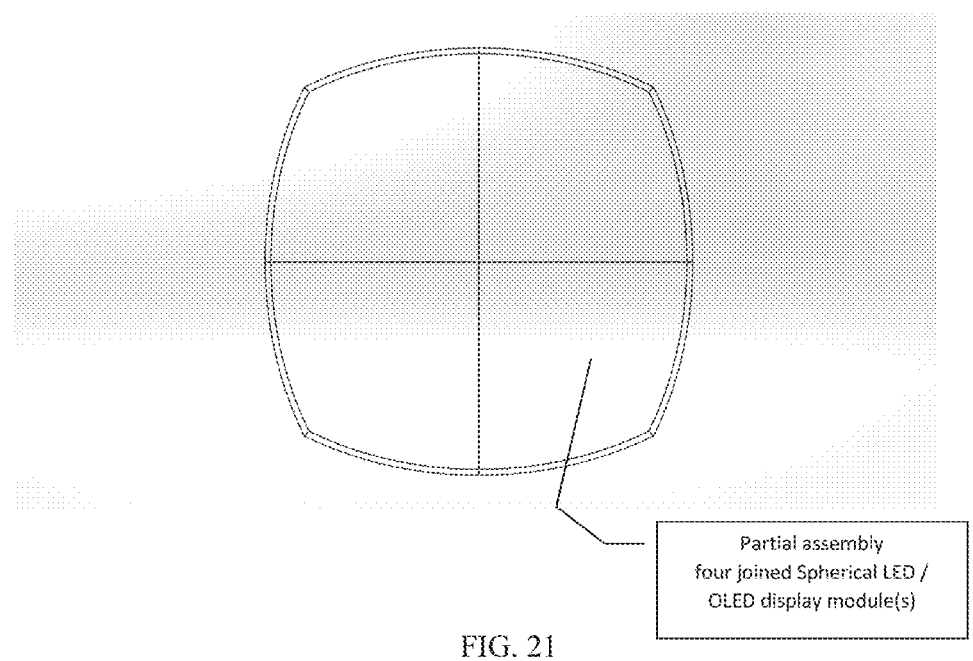
FIG. 21 illustrates a partial assembly of spherical display modules, according to an embodiment.
Figure 22:
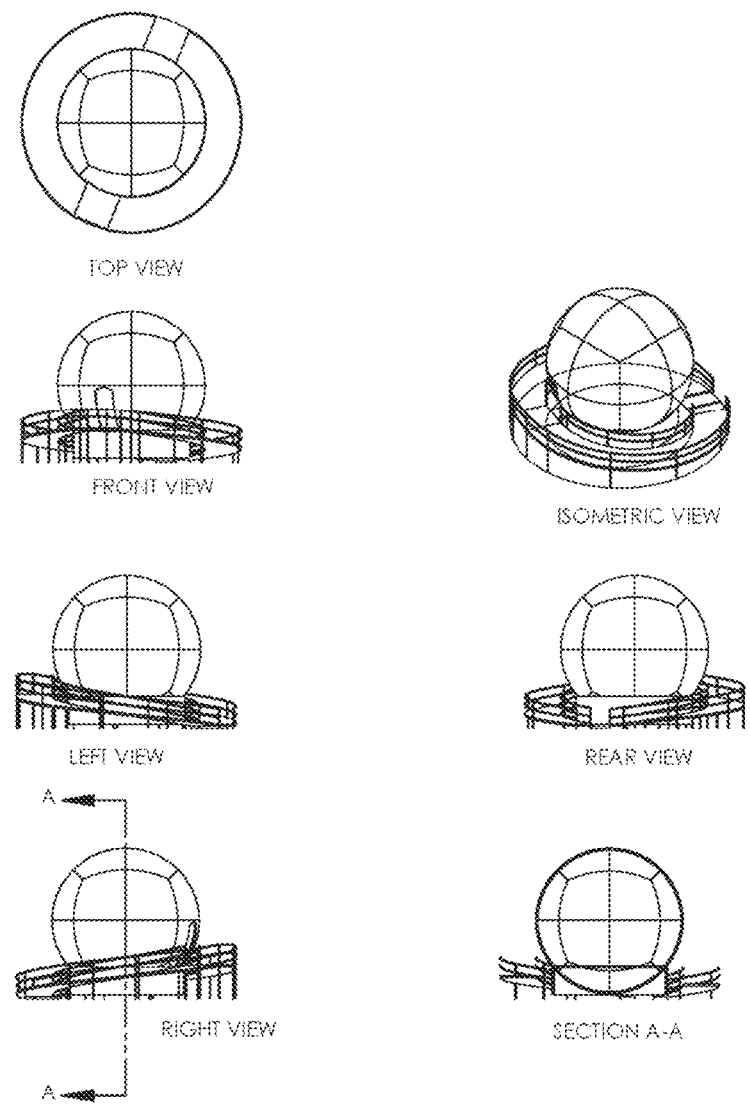
FIG. 22 illustrates multiple views including a top view, front view, isometric view, left view, rear view, right view and section a-a, of a spherical digital display system, according to an embodiment.
Figure 23:
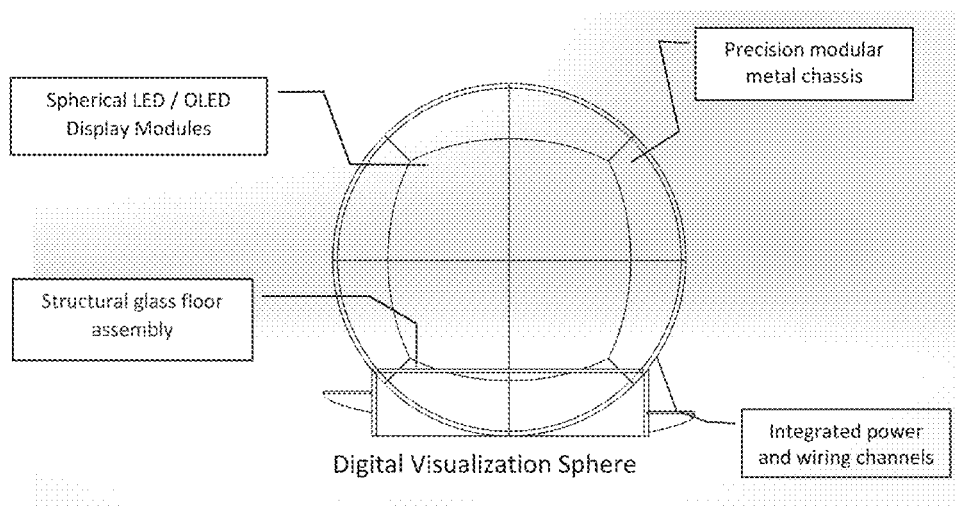
FIG. 23 illustrates a spherical digital display system, according to an embodiment.
Figure 24:
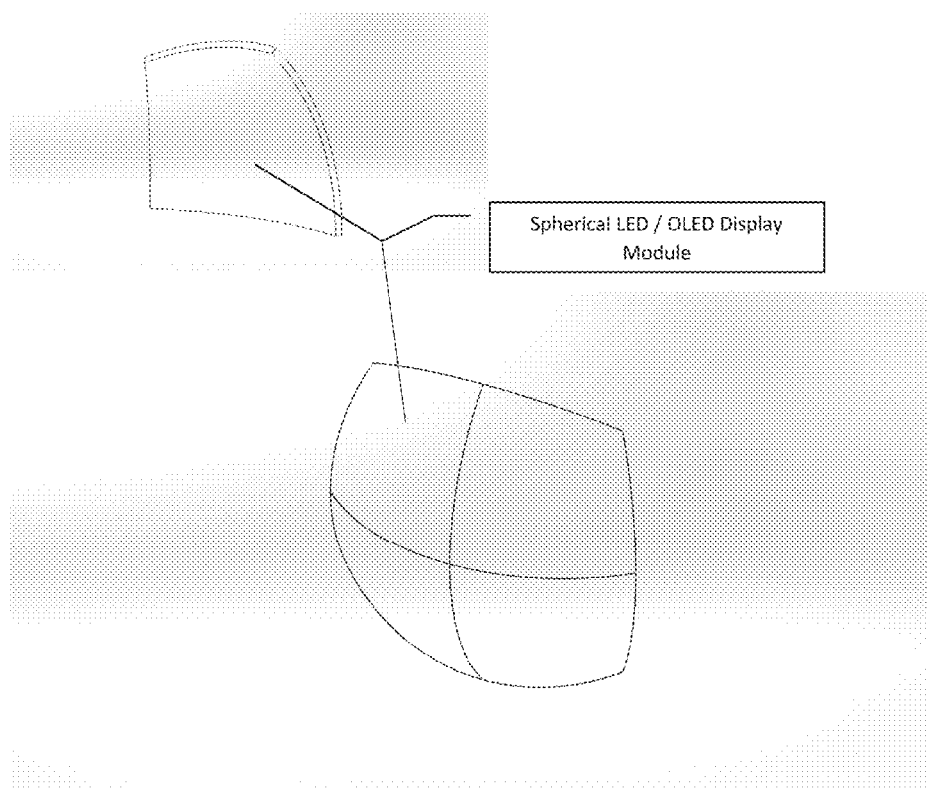
FIG. 24 illustrates spherical display modules, according to an embodiment.
Figure 25:
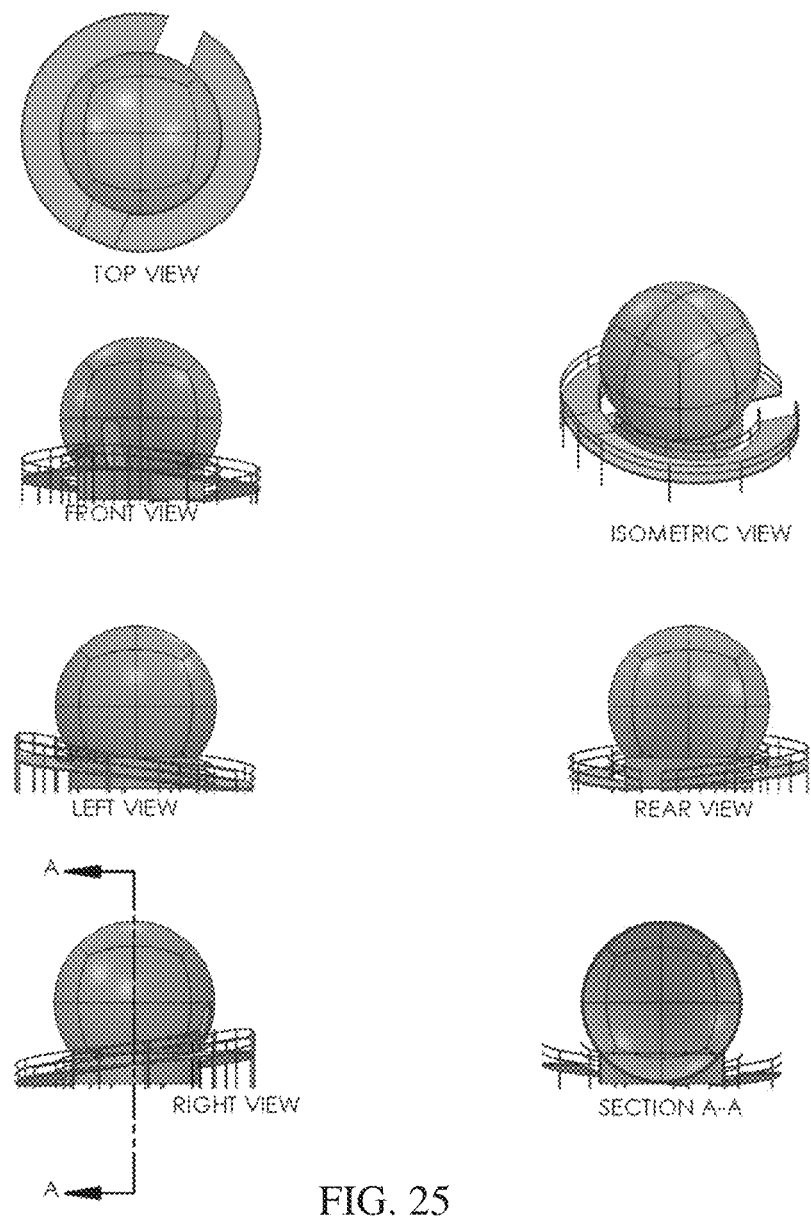
FIG. 25 illustrates multiple 3D perspective views including a top view, front view, isometric view, left view, rear view, right view and section a-a, of a spherical digital display system, according to an embodiment.

An embodiment of the digital visualization sphere and hemispherical dome display includes a spherical form fixture digital display assembly according to an embodiment of the present invention is shown in FIG. 20a. The geometric modalities of the digital visualization sphere and hemispherical dome display for example employing spherical cube geometry with 120 degree intersects with each segment bisected into equal quadrants of a sphere as shown in FIG. 20b, and will include; a precision modular metal chassis, power supply, a cooling system with cooling fans, cooling blocks and a control system, comprising a control board with processor, display board and a substrate. It also includes a digital video interface and an automatic addressing system. The present invention further includes a method of assembly with LED/OLED spherical digital display module integration and a method of replacing, adding, or removing one or more assemblies in varying sizes and configurations as shown in FIGS. 21 and 24.

Referring to FIGS. 22-23 and 25-26, an embodiment includes a digital visualization sphere and hemispherical dome display utilizing LED/OLED spherical digital display module(s) comprised of emissive displays with pixel elements, or group of pixel elements being individually addressable to display an image. These displays are described as fixed format displays. The term "fixed format" refers to addressable, fixed position, pixel elements. Fixed format displays can be spherically shaped and scalable. Emissive displays include Light Emitting Diode, Plasma, electroluminescent displays, etc.

The embodiment is a configurable transitionally adaptable digital visualization sphere and hemispherical dome display utilizing LED/OLED spherical digital display module(s) and assemblies for use in large-screen immersive display applications. The digital visualization sphere and hemispherical dome display utilizes LED/OLED spherical digital display module(s) according to an embodiment of the present invention is operating with a set of LED/OLED spherical radius of curvature display sectors forming a larger modular display. The word "display" means a set of addressable pixels in an array or in groups of arrays. Several LED/OLED spherical digital display module(s) will be integrated to form a larger display, i.e. multiple display elements arranged side-by-side so that they can be viewed as a single spherical image.

The hardware of the digital visualization sphere and hemispherical dome display utilizes LED/OLED spherical digital display module(s) combined with a spherical form factor precision electronics chassis and enclosure containing an array of LED/OLED printed circuit board(s) (PCB), assembly, control board(s), display board(s), power supply(s), data connectors and heat mitigation systems. The LED/OLED spherical digital display module(s) assemblies are connected to processing system.

A precision spherical form factor modular metal chassis serves as the primary mechanical structure for all of electronic elements, control cards, PCB boards, integrated power and wiring channels and LED/OLED spherical digital display module(s). Precision modular metal chassis will accommodate front or alternatively rear module access for the LED/OLED spherical digital display module(s) assemblies repair and replacement. The precision chassis is formed of any suitably strong material, such as light metal alloys, that will support the shape and structure of the digital visualization sphere and hemispherical dome display utilizing LED/OLED spherical digital display module(s) and assemblies. The precision chassis is a fixed shaped modular array configuration comprised of LED/OLED spherical digital display module(s) and assemblies. Mounted within the precision chassis are positioning plates, threaded inserts, connection points and pins with alignment tabs. The precision chassis will have air inlets and outlets and data and power input and output connectors. The digital visualization sphere and hemispherical dome display utilizing LED/OLED spherical digital display module(s) and assembly will mechanically couple to positioning plates and holes and alignment slots.

Also positioned within enclosure are integrated wiring channels with data input, data output, power input, and power output connectors. Data input connectors and data output connectors are conventional signal connectors like DVI or MOLEX. The data input connector provides a connection to receive serial video data signals containing the current video frame information and serial control data signals from a general processor to be displayed on the digital visualization sphere and hemispherical dome display utilizing LED/OLED spherical digital display module(s) assemblies.

The transitionally adaptive LED/OLED display module(s) and LED/OLED assembly can re-transmit serial video and control data signals to an adjacent, LED/OLED assembly via data output connectors. The conventional power input and power output connectors provides an electrical connection for receiving AC input power to the LED/OLED spherical digital display module(s) and assemblies.

The substrate material of the LED/OLED spherical digital display module(s) and assembly is non-conductive. The pixel array substrate is formed of a plurality of addressable discrete LED/OLED pixels. Those skilled in the art will appreciate that the LED/OLED devices for forming graphics display are typically arranged in rows and columns to form an LED/OLED matrix. The display is not limited to Cartesian co-ordinates but may be formed with equal vertex ray angles and other co-ordinate systems.

Standard connectors are required for transferring signals and power from control board to the plurality of LED/OLED spherical digital display module(s) and boards. One connector is required per LED/OLED spherical digital display module assembly. Connectors must span the distance between LED/OLED spherical digital display module(s) and LED/OLED control boards with precise clearances for the thickness of chassis channel openings, cooling blocks, wiring, etc.

The control board is a conventional printed circuit board (PCB) formed of a material such as ceramic or FR4, which are mounted the local processing and control devices needed to operate the LED/OLED spherical digital display module(s) and assemblies. In general, control board performs pre-processing tasks, such as gamma correction, gamma adjustment of the incoming signal, color and light calibration.

Multi-line distribution of signal data comes from a central processing unit and supplied to an input signal of serial video and control data. Data is re-transmitted to LED/OLED spherical digital display module(s) assembly. Similarly, data transmits the received serial video and control data signal to an input of data and to data input connector of LED/OLED spherical digital display module(s) assembly. The data transmits the received serial video and control data to data input connector LED/OLED spherical digital display module(s) assembly. The data in signal is distributed to all LED/OLED spherical digital display module(s) assembly. The serial video and control data is transferred from one LED/OLED assembly to the next LED/OLED assembly. In each case, the serial video and control data is re-transmitted by control board of each LED/OLED spherical digital display module(s) assembly.

A conventional power supply with an AC-to-DC converter and a voltage regulator to the LED/OLED spherical digital display module may be required. Conventional DC cooling fans capable of providing a volume rate of airflow in order to maintain an operating temperature for LED/OLED spherical digital display module(s) are required. Insulation sheets for the power supply of a suitable material, such as mica is required.

Multi-line distribution of electrical power is accomplished by AC power connections from one LED/OLED spherical digital display module(s) assembly to the next. A power input signal from the main power supply is supplied to LED/OLED spherical digital display module(s) via an electrical connection to power input connector on the LED/OLED assembly. AC power is then transferred from LED/OLED assembly to LED/OLED assembly via an electrical connection between power output connector assembly and power input connector on the LED/OLED assemblies.

The central system controller is aware of the X and Y configuration of each LED/OLED spherical digital display module(s) assembly. LED/OLED spherical digital display module(s) location in the array are addressed with sophisticated software.

Each LED/OLED spherical digital display module is assigned a unique number in the picture co-ordinates. The LED/OLED spherical digital display module(s) are established at set-up and each assembly stores its configuration information locally so the process is not be repeated with each power cycle. LED/OLED spherical digital display module(s) processing is fed by an incoming red, green, blue data signal RGB DATA IN that is a serial data signal containing the current video frame information to be displayed on LED/OLED assembly.

The processing unit buffers the incoming RGB data signal and supplies an RGB output data signal. Control data from a general processor, such as a personal computer (PC) for example functions as the system-level controller of each LED/OLED assembly is supplied to a processing unit via a serial data bus that provides control information to each LED/OLED spherical digital display module(s), with color temperature, gamma, and imaging information. The spherical digital display processing unit buffers the control data from the data bus supplying an output control data signal to an outgoing data bus to each LED/OLED spherical digital display module processing unit then re-transmits the data signal RGB data inputs and the control data on the data bus to the next LED/OLED spherical digital display module.

The imaging information from the control data signal on the data bus, LED/OLED processing unit, stores the RGB serial data signal for each frame that corresponds to either LED/OLED spherical digital display module(s) to the physical position of a LED/OLED spherical digital display module being used within a larger display.

In the case of each LED/OLED spherical digital display module the processing unit of each LED/OLED assembly associated with an LED/OLED array in the display receives the RGB data signal and moves this information into specific data packets associated with the location of LED/OLED within the display. Algorithms running on each LED/OLED display module belongs to its physical portion of the display. The processing unit distributes a serial RGB signal to a pre-processor which belongs to a portion of the display.

Similarly, the LED/OLED spherical digital display processing unit receives the control data on the control data bus and parses this information into specific control buses associated with the location of each LED/OLED spherical digital display module.

The electrically connected elements of LED/OLED spherical digital display control system are as follows; The RGB signal from processing unit feeds a pre-processor; a pre-processor control bus output feeds a bank switch controller; a pre-processor control bus output feeds the CCD controller; a control bus output feeds bank switches that are connected to the row lines of LED/OLED spherical digital display module(s); and a pulse width modulation control bus output feeds current sources that are connected to the column lines of LED/OLED array via active switch devices, such as MOSFET switches or transistors. An analog voltage bus output of LED/OLED array feeds A/D converter; a digital voltage bus output converter feeds module interface; and a temperature data bus output feeds module interface. The LED/OLED spherical digital display processing control bus output feeds module interface. Diagnostic information is available to processing unit via the data bus module.

An embodiment includes an apparatus comprising a plurality of spherical display tiles, a mechanical standoff structure having rubberized standoffs and that penetrate each display tile of the plurality of display tiles inserted into the mechanical standoff structure, a transparent material surface overlaid onto the rubberized standoffs of the mechanical standoff structure, wherein the transparent material surface is contoured to match contours of the mechanical standoff structure, and wherein the plurality of display tiles display video signals delivered from a video processing device.

Some approaches may include:

Spatial Augmentation Reality/Virtual Reality

Telepresence and Telexistance Capable/Digital Visualization Chamber

Spherical Geometric modalities, modular assembly, LED/OLED display module(s)

Immersive Spherical Digital Cinema Fixtures & Assembly

Juxtapositional.

Seamless Digital Display Environment/Spherical Immersive Digital Cinema

Spherical Digital Display Modules/Module access for LED repair and replacement

Spherical wrap around digital visualization/Spherical LED Modules transition well with uniformity PCB board/Printed Circuitry/Control card/LED Control Board/LED Display Board Digital image management software 3.0. Implementation Mechanism-Hardware Overview According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 27:
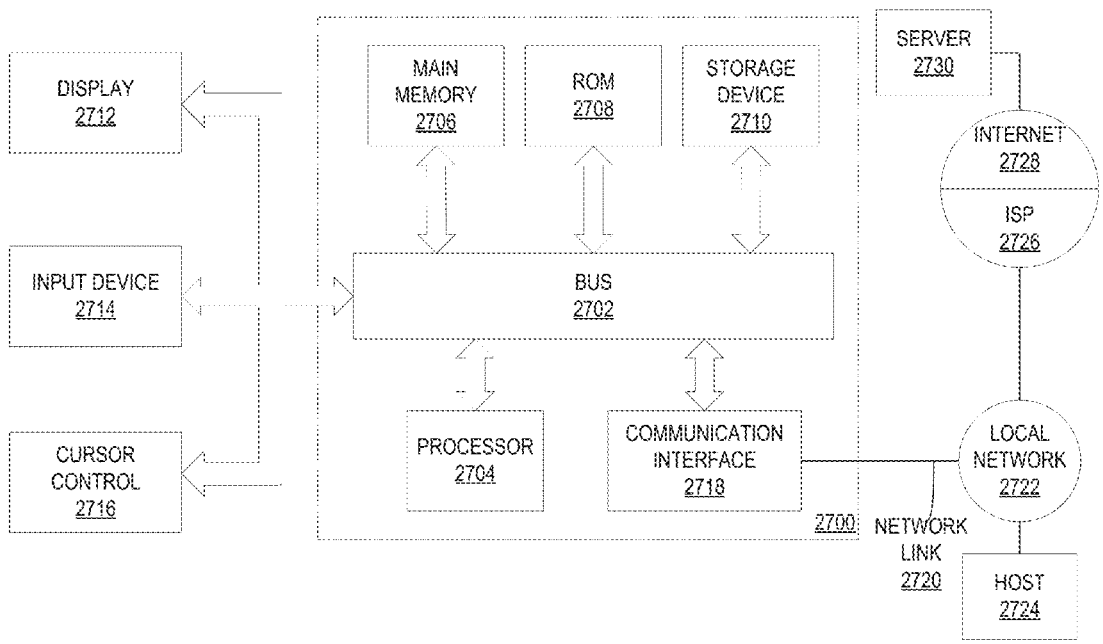
FIG. 27 is block diagram of a computer system upon which embodiments of the invention may be implemented.

FIG. 27 is a block diagram that illustrates a computer system 2700 utilized in implementing the above-described techniques, according to an embodiment. Computer system 2700 may be, for example, a desktop computing device, laptop computing device, tablet, smartphone, server appliance, computing mainframe, multimedia device, handheld device, networking apparatus, or any other suitable device.

Computer system 2700 includes one or more busses 2702 or other communication mechanism for communicating information, and one or more hardware processors 2704 coupled with busses 2702 for processing information. Hardware processors 2704 may be, for example, a general purpose microprocessor. Busses 2702 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 2700 also includes a main memory 2706, such as a random access memory (RAM) or other dynamic or volatile storage device, coupled to bus 2702 for storing information and instructions to be executed by processor 2704. Main memory 2706 also may be used for storing temporary variables or other intermediate information during execution of instructions to be executed by processor 2704. Such instructions, when stored in non-transitory storage media accessible to processor 2704, render computer system 2700 into a special-purpose machine that is customized to perform the operations specified in the instructions.

Computer system 2700 further includes one or more read only memories (ROM) 2708 or other static storage devices coupled to bus 2702 for storing static information and instructions for processor 2704. One or more storage devices 2710, such as a solid-state drive (SSD), magnetic disk, optical disk, or other suitable non-volatile storage device, is provided and coupled to bus 2702 for storing information and instructions.

Computer system 2700 may be coupled via bus 2702 to one or more displays 2712 for presenting information to a computer user. For instance, computer system 2700 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 2712 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 2712.

In an embodiment, output to display 2712 may be accelerated by one or more graphics processing unit (GPUs) in computer system 2700. A GPU may be, for example, a highly parallelized, multi-core floating point processing unit highly optimized to perform computing operations related to the display of graphics data, 3D data, and/or multimedia. In addition to computing image and/or video data directly for output to display 2712, a GPU may also be used to render imagery or other video data off-screen, and read that data back into a program for off-screen image processing with very high performance. Various other computing tasks may be off-loaded from the processor 2704 to the GPU.

One or more input devices 2714 are coupled to bus 2702 for communicating information and command selections to processor 2704. One example of an input device 2714 is a keyboard, including alphanumeric and other keys. Another type of user input device 2714 is cursor control 2716, such as a mouse, a trackball, or cursor direction keys for communicating direction information and command selections to processor 2704 and for controlling cursor movement on display 2712. This input device typically has two degrees of freedom in two axes, a first axis (e.g., x) and a second axis (e.g., y), that allows the device to specify positions in a plane. Yet other examples of suitable input devices 2714 include a touch-screen panel affixed to a display 2712, cameras, microphones, accelerometers, motion detectors, and/or other sensors. In an embodiment, a network-based input device 2714 may be utilized. In such an embodiment, user input and/or other information or commands may be relayed via routers and/or switches on a Local Area Network (LAN) or other suitable shared network, or via a peer-to-peer network, from the input device 2714 to a network link 2720 on the computer system 2700.

A computer system 2700 may implement techniques described herein using customized hard-wired logic, one or more ASICs or FPGAs, firmware and/or program logic which in combination with the computer system causes or programs computer system 2700 to be a special-purpose machine. According to one embodiment, the techniques herein are performed by computer system 2700 in response to processor 2704 executing one or more sequences of one or more instructions contained in main memory 2706. Such instructions may be read into main memory 2706 from another storage medium, such as storage device 2710. Execution of the sequences of instructions contained in main memory 2706 causes processor 2704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 2710. Volatile media includes dynamic memory, such as main memory 2706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2702. Transmission media can also take the form of acoustic or light waves, such as those generated during radio-wave and infra-red data communications.

Various forms of media may be involved in carrying one or more sequences of one or more instructions to processor 2704 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 2700 can receive the data on the network and demodulate the signal to decode the transmitted instructions. Appropriate circuitry can then place the data on bus 2702. Bus 2702 carries the data to main memory 2706, from which processor 2704 retrieves and executes the instructions. The instructions received by main memory 2706 may optionally be stored on storage device 2710 either before or after execution by processor 2704.

A computer system 2700 may also include, in an embodiment, one or more communication interfaces 2718 coupled to bus 2702. A communication interface 2718 provides a data communication coupling, typically two-way, to a network link 1020 that is connected to a local network 1022. For example, a communication interface 1018 may be an integrated services digital network (ISDN) card, cable modem, satellite modem, or a modem to provide a data communication connection to a corresponding type of telephone line. As another example, the one or more communication interfaces 1018 may include a local area network (LAN) card to provide a data communication connection to a compatible LAN. As yet another example, the one or more communication interfaces 1018 may include a wireless network interface controller, such as a 802.11-based controller, Bluetooth controller, Long Term Evolution (LTE) modem, and/or other types of wireless interfaces. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by a Service Provider 1026. Service Provider 1026, which may for example be an Internet Service Provider (ISP), in turn provides data communication services through a wide area network, such as the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

In an embodiment, computer system 1000 can send messages and receive data, including program code and/or other types of instructions, through the network(s), network link 1020, and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. As another example, information received via a network link 1020 may be interpreted and/or processed by a software component of the computer system 1000, such as a web browser, application, or server, which in turn issues instructions based thereon to a processor 1004, possibly via an operating system and/or other intermediate layers of software components.

In an embodiment, some or all of the systems described herein may be or comprise server computer systems, including one or more computer systems 1000 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

4.0. Extensions and Alternatives

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An immersive digital visualization sphere comprising:
    a plurality of spherical display module assemblies, each spherical display module assembly comprised of a digital display mounted to a modular chassis configured to attach to other modular chassis, each modular chassis having digital display placement adjusters;
    a mechanical standoff structure, the mechanical standoff structure formed in a substantially spherical shape, the plurality of spherical display module assemblies attached to the interior of the mechanical standoff structure;
    wherein the plurality of display module assemblies display video signals delivered from a video processing device, the display video signals cause the plurality of display module assemblies to collectively display a spherical image.

2. The immersive digital visualization sphere of claim 1, wherein a set of spherical display module assemblies form a quadrant of a sphere.

3. The immersive digital visualization sphere of claim 1, wherein the immersive digital visualization sphere communicates with other immersive digital visualization spheres among a plurality of immersive digital visualization spheres.

4. The immersive digital visualization sphere of claim 1, wherein a spherical display module assembly among the plurality of spherical display module assemblies transmits serial and video control data signals to adjacent spherical display module assemblies among the plurality of spherical display module assemblies.

5. The immersive digital visualization sphere of claim 1, further comprising:
    a glass floor assembly positioned in a bottom portion of the mechanical standoff structure that allows viewers to stand within the immersive digital visualization sphere.

6. The immersive digital visualization sphere of claim 1, further comprising:
    a central system controller records relative positional information of each spherical display module assembly among the plurality of spherical display module assemblies.

7. The immersive digital visualization sphere of claim 1, further comprising:
    a central system controller records relative positional information of each spherical display module assembly among the plurality of spherical display module assemblies;
    wherein the central system controller assigns a unique number in picture coordinates to each spherical display module assembly among the plurality of spherical display module assemblies.

8. The immersive digital visualization sphere of claim 1, further comprising:
    a central system controller records relative positional information of each spherical display module assembly among the plurality of spherical display module assemblies;
    wherein the central system controller assigns a unique number in picture coordinates to each spherical display module assembly among the plurality of spherical display module assemblies;
    wherein each spherical display module assembly among the plurality of spherical display module assemblies stores the assigned unique number.

* * * * *